(12) United States Patent
Kuroda et al.

(10) Patent No.: US 9,133,931 B2
(45) Date of Patent: Sep. 15, 2015

(54) BALL STUD, DUST COVER, AND STABILIZER LINK

(75) Inventors: Shigeru Kuroda, Yokohama (JP); Shuji Ohmura, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 222 days.

(21) Appl. No.: 13/641,587

(22) PCT Filed: Mar. 17, 2011

(86) PCT No.: PCT/JP2011/056386
§ 371 (c)(1), (2), (4) Date: Oct. 16, 2012

(87) PCT Pub. No.: WO2011/132483
PCT Pub. Date: Oct. 27, 2011

(65) Prior Publication Data
US 2013/0033016 A1    Feb. 7, 2013

(30) Foreign Application Priority Data
Apr. 21, 2010  (JP) .................................. 2010-098057

(51) Int. Cl.
*B62D 7/16* (2006.01)
*F16J 3/04* (2006.01)
*F16C 11/06* (2006.01)

(52) U.S. Cl.
CPC ............. *F16J 3/042* (2013.01); *F16C 11/0604* (2013.01); *F16C 11/0666* (2013.01); *F16C 11/0671* (2013.01); *Y10T 403/32631* (2015.01)

(58) Field of Classification Search
CPC .......................... F16C 11/0666; F16C 11/0671
USPC ................................................ 403/50, 51, 134
See application file for complete search history.

(56) References Cited

U.S. PATENT DOCUMENTS

| | | | | |
|---|---|---|---|---|
| 4,572,693 A | * | 2/1986 | Nemoto | 403/134 |
| 5,601,378 A | | 2/1997 | Fukukawa et al. | |
| 5,752,780 A | * | 5/1998 | Dorr | 403/135 |
| 6,287,040 B1 | | 9/2001 | Fischer | |
| 6,505,989 B1 | | 1/2003 | Pazdirek et al. | |
| 6,652,179 B2 | * | 11/2003 | De Freitas | 403/134 |

(Continued)

FOREIGN PATENT DOCUMENTS

| | | |
|---|---|---|
| EP | 1 233 196 A2 | 8/2002 |
| JP | U-03-093615 | 9/1991 |

(Continued)

OTHER PUBLICATIONS

International Search Report issued in International Application No. PCT/JP2011/056386 dated Apr. 12, 2011.

(Continued)

*Primary Examiner* — Michael P Ferguson
(74) *Attorney, Agent, or Firm* — Oliff PLC

(57) ABSTRACT

A ball stud has a flange that outwardly projects in a radial direction of a stud portion. The flange has a concave portion that has a curved shape from a root to an outer circumferential portion in cross section. The concave portion is concave with respect to a straight line connecting an end on the root side and an end on the outer circumferential portion side of the curved shape. A dust cover has a lip to be abutted on a sealing portion and the flange of the ball stud. The lip is formed with a side lip portion. The side lip portion has a shape corresponding to the curved shape of the concave portion of the flange so as to be abutted on the concave portion.

7 Claims, 5 Drawing Sheets

(56) References Cited

U.S. PATENT DOCUMENTS

| | | |
|---|---|---|
| 7,134,801 B2 * | 11/2006 | Kuroda .......................... 403/50 |
| 2005/0281610 A1 | 12/2005 | MacLean et al. |
| 2009/0047063 A1 | 2/2009 | Shirai et al. |
| 2009/0074504 A1 * | 3/2009 | Morales Arnaez .............. 403/77 |

FOREIGN PATENT DOCUMENTS

| | | | |
|---|---|---|---|
| JP | A-08-159147 | 6/1996 | |
| JP | A-11-223209 | 8/1999 | |
| JP | A-2011-058518 | 3/2011 | |
| WO | WO 2006/098124 A1 | 9/2006 | |
| WO | WO 2006/138663 * | 12/2006 | .............. F16C 11/06 |

OTHER PUBLICATIONS

Oct. 13, 2014 European Search Report issued in Application No. 11771823.9.

* cited by examiner

BALL STUD, DUST COVER, AND STABILIZER LINK

TECHNICAL FIELD

The present invention relates to a ball stud having a flange, a dust cover having a lip to be abutted on the flange of the ball stud, and a stabilizer link provided with them. In particular, the present invention relates to improvements of the shapes of the flange of the ball stud and the lip of the dust cover, which abut each other.

BACKGROUND ART

Stabilizer links are ball joint parts for connecting a suspension and a stabilizer. FIG. 1 is a perspective view of an approximate structure of a vehicle from the front wheels side. A suspension 10 is provided to right and left tire 30 and has an arm 11 and a cylinder 12. The arm 11 has a lower end portion that is fixed to a bearing portion which supports a shaft of the tire 30. The cylinder 12 is elastically displaceable with respect to the arm 11. The arm 11 is provided with a bracket 13 to which a stabilizer link 200 is fixed. The suspensions 10 support the weight of the vehicle body applied to the tires 30. A stabilizer 20 has a bar 21 with an approximately U-shaped and is mounted to the vehicle body via bushes 22. The stabilizer 20 provides roll stiffness for the vehicle.

One of the stabilizer links 200 is provided to the bracket 13 of the suspension 10, and the other is provided to an end of the bar 21 of the stabilizer 20. The stabilizer links 200 are connected with each other by a support bar 500. The stabilizer links 200 transmit load, which is generated when the suspension 10 receives input power from a road surface, to the stabilizer 20.

FIG. 2 is a cross section that shows a structure of the stabilizer link 200. The stabilizer link 200 includes a ball stud 201, a ball seat 301, a housing 302, and a dust cover 401. The ball stud 201 has a stud portion 210 and a ball portion 220, which are integrally formed.

The stud portion 210 has a tapered portion 211, a sealing portion 212, and a screw portion 213. The tapered portion 211 is formed at an upper end portion of the ball portion 220. The sealing portion 212 has an upper end portion that is formed with a flange 214 and has a lower end portion that is formed with a projection 215. The dust cover 401 has an upper end portion that is formed with a lip 411, and the lip 411 is abutted and is secured to the sealing portion 212 between the flange 214 and the projection 215. The screw portion 213 of the stabilizer link 200 in the side of the suspension 10 is screwed to the bracket 13 of the arm 11. The screw portion 213 of the stabilizer link 200 in the side of the stabilizer 20 is screwed to the bar 21.

The ball seat 301 and the housing 302 form a supporting member for universally and pivotally supporting the ball stud 201. The ball seat 301 is press fitted with the ball portion 220 of the ball stud 201. The housing 302 accommodates the ball seat 301. The dust cover 401 has a lower end portion that is held between a flange 321 at an upper end of the ball seat 301 and a flange 311 at an upper end of the housing 302.

In this stabilizer link 200, in order to prevent the entry of dust between the ball portion 220 of the ball stud 201 and the ball seat 301, it is important to tightly seal the sealing portion 212 of the ball stud 201 and the lip 411 of the dust cover 401.

Nevertheless, in the above stabilizer link 200, when the ball stud 201 is fully swung under low temperature conditions, there is a possibility of occurrence of opening of the lip 401 of the dust cover 400. That is, the lip 411 may be disconnected from the sealing portion 211 and opens as shown in FIG. 3. In conventional techniques, an O-ring is mounted to the lip 411 so as to ensure sealing characteristics. In this case, the O-ring is provided as a separate member, whereby the production cost is increased.

In regard to this, as shown in FIG. 4A, a technique of providing a side lip portion 412 to the lip 411 of the dust cover 401 has been developed. In this technique, the side lip portion 412 is abutted on an outer circumferential portion of the flange 214 of the ball stud 201 when the dust cover 401 is fitted. The outer circumferential portion of the flange 214 may be extended in the direction of the leading end of the axis and may have a sharp-edged end. In this case, when the dust cover 401 is fitted, as shown in FIG. 4B, there is a possibility that the side lip portion 412 contacts the edge of the outer circumferential portion of the flange 214 and is folded down. Therefore, high assembling productivity cannot be obtained in a mass production line.

In order to prevent the folding down, a technique of forming a tapered portion at the outer circumferential portion of the flange 214 of the ball stud 201 is suggested (for example, WO2006/098124). Specifically, in the technique disclosed in WO2006/098124, the tapered portion is inclined so that the diameter thereof expands from the root to the outer circumferential portion of the flange in the axial cross-section. In this case, the side lip portion of the dust cover has a shape corresponding to the shape of the tapered portion.

However, in the technique disclosed in WO2006/098124, occurrence of the folding down can be prevented, but the flange of the ball stud and the side lip portion of the dust cover are not tightly sealed. Meanwhile, in view of reduction of environmental burdens of vehicles (increase of fuel efficiency) and improvement of motion performance, reducing the weight of vehicle parts is strongly desired. The conventional techniques have not responded to the requirement sufficiently.

DISCLOSURE OF THE INVENTION

An object of the present invention is to provide a ball stud, a dust cover, and a stabilizer link provided with them, in which the sealing characteristics are improved and the weights thereof are reduced, while assembling productivity in a mass production line is improved.

The present invention provides a ball stud including a stud portion with an approximately columnar shape and including a ball portion that is formed at an end of the stud portion. The stud portion is formed with a flange that projects radially outwardly. The flange has a root and an outer circumferential portion and has a concave portion with a curved shape from the root to the outer circumferential portion in an axial cross-section. The concave portion is concave with respect to a straight line that connects an end on the root side and an end on the outer circumferential portion side of the curved shape.

In the ball stud of the present invention, the concave portion has a curved shape from the root to the outer circumferential portion in the axial cross-section of the flange of the stud portion. The concave portion is concave with respect to the straight line that connects the end on the root side and the end on the outer circumferential portion side of the curved shape. Therefore, unlike the case of the structure in which the outer circumferential portion of the flange extends in the direction of the leading end of the axis and has the sharp-edged end, the occurrence of the folding down is prevented. As a result, the assembling productivity in a mass production line is improved.

Moreover, the concave portion with such concaved shape has a larger area for contacting a side lip portion of a dust cover when the dust cover is assembled, compared with flat portions or tapered portions of conventional techniques. The flat portions have a constant thickness from a root to an outer circumferential portion of a flange. The tapered portions are straightly sloped from a root to an outer circumferential portion of a flange. Accordingly, higher sealing characteristics are obtained between the concave portion and the dust cover. Furthermore, the flange having the concave portion can be reduced in weight compared with the flat portions or the tapered portions of the conventional techniques.

The ball stud of the present invention may have another modified structure. For example, the end on the root side of the concave portion may be formed with a rounded corner. In this structure, the position of a side lip portion of a dust cover is stabilized, whereby higher sealing characteristics are obtained between the flange and the dust cover. In addition, the end on the outer circumferential portion side of the concave portion may be formed with a rounded corner. In this structure, the flange has a larger area for contacting a side lip portion of a dust cover, whereby higher sealing characteristics are obtained between the flange and the dust cover.

The concave portion has an intermediate part that may be formed with one or plural curved portions. In this structure, the flange has a larger area for contacting a side lip portion of a dust cover without having a larger outer diameter. Accordingly, further higher sealing characteristics are obtained between the concave portion and the dust cover.

The present invention also provides a dust cover that has a lip to be abutted on the flange of the ball stud of the present invention. That is, the present invention also provides a dust cover including a lip to be abutted on the flange of the ball stud of the present invention, and the lip has an end that is formed with a side lip portion which has a shape corresponding to the curved shape of the concave portion so as to be abutted thereon.

The dust cover of the present invention has the side lip portion that is formed at the end of the lip, and the side lip portion has a shape corresponding to the curved shape of the concave portion so as to be abutted thereon. Therefore, the dust cover has a large area for contacting the flange of the ball stud. Accordingly, high sealing characteristics are obtained between the flange of the ball stud and the dust cover, whereby it is not necessary to mount an O-ring at the lip of the dust cover. As a result, the production cost can be reduced.

Moreover, since the side lip portion is formed, the occurrence of opening is prevented even when the ball stud is fully swung under low temperature conditions. The side lip portion has a root that may be formed with a rounded corner according to the shape of the rounded corner at the end on the root side of the concave portion of the ball stud. In this case, the occurrence of opening of the side lip portion is prevented without increasing biasing force of the side lip portion to the flange.

The dust cover of the present invention may have another modified structure. For example, the side lip portion may have a structure so that the circumferential end thereof receives a maximum surface pressure when abutting on the concave portion of the flange. In this structure, higher sealing characteristics are obtained between the flange of the ball stud and the dust cover. This structure is obtained by using various shapes. For example, the circumferential end of the side lip portion may be formed so as to have a maximum thickness. Moreover, the circumferential end of the side lip portion may be formed so that the interference between the side lip portion and the concave portion of the flange is the maximum.

The present invention also provides a stabilizer link including the ball stud and the dust cover of the present invention. According to the stabilizer link of the present invention, the effects of the ball stud of the present invention and the effects of the dust cover of the present invention are obtained.

EFFECTS OF THE INVENTION

According to the ball stud, the dust cover, or the stabilizer link, of the present invention, while the assembling productivity in a mass production line is improved, high sealing characteristics are obtained, and reduction in weight is performed.

BRIEF DESCRIPTION OF THE DRAWINGS

FIG. 5A is a cross section of the abutting condition, and FIG. 5B is an enlarged cross section of the structure within the frame indicated by the reference symbol X in FIG. 5A.

FIG. 6A shows a general structure of the ball stud, and FIG. 6B is a view for describing a cross sectional shape of a concave portion of a flange of the ball stud.

Figure 1:
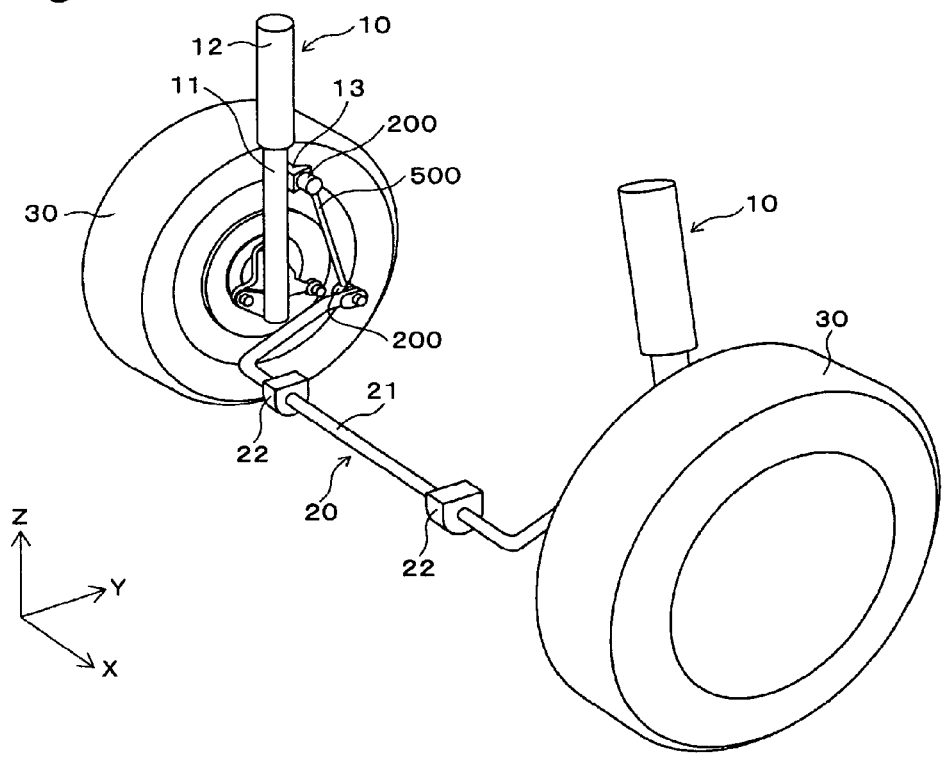
FIG. 1 is a perspective view that shows an approximate structure of a vehicle from a front wheels side.

EXPLANATION OF REFERENCE NUMERALS 110 denotes a ball stud, 111 denotes a flange, 112 denotes a concave portion, 121, 121A, and 121B denote a dust cover, 122 denotes a lip, and 123, 123A, and 123B denote a side lip portion.

BEST MODE FOR CARRYING OUT THE INVENTION

Figure 5A:
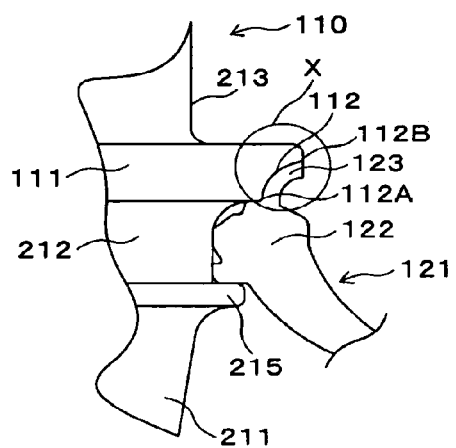
FIGS. 5A and 5B show an abutting condition of a flange of a ball stud and a lip of a dust cover relating to an embodiment of the present invention.
Figure 5B:
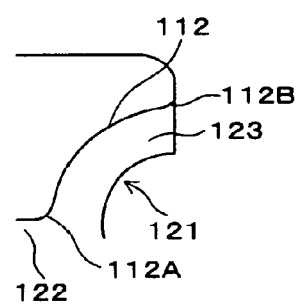
Figure 6A:
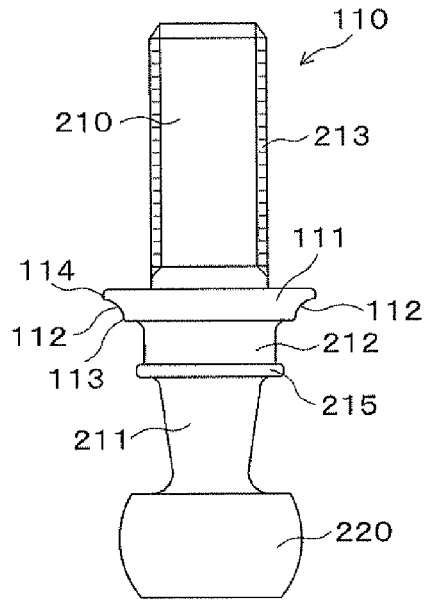
FIGS. 6A and 6B are views for describing a ball stud relating to an embodiment of the present invention.
Figure 6B:
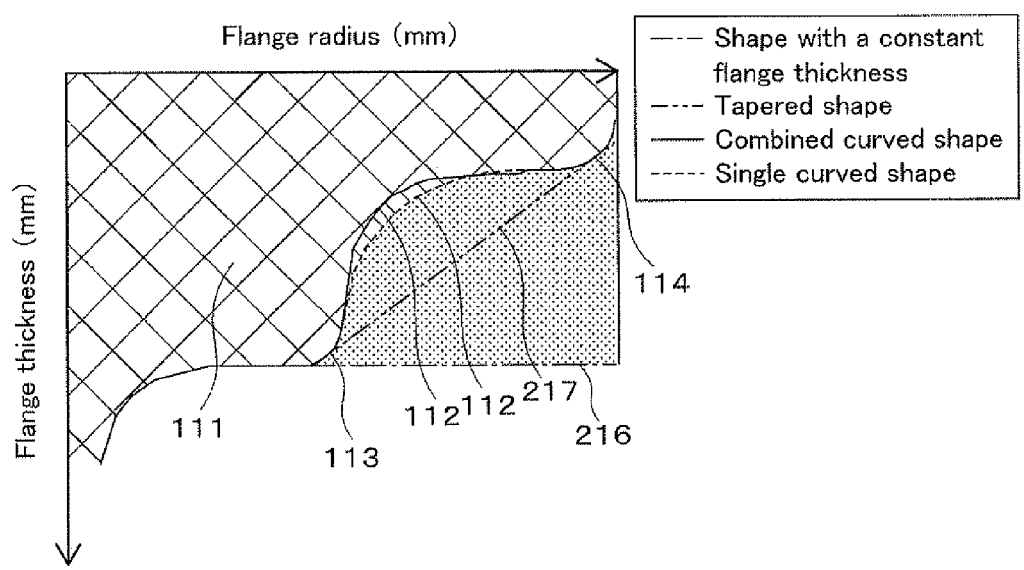
Figure 7A:
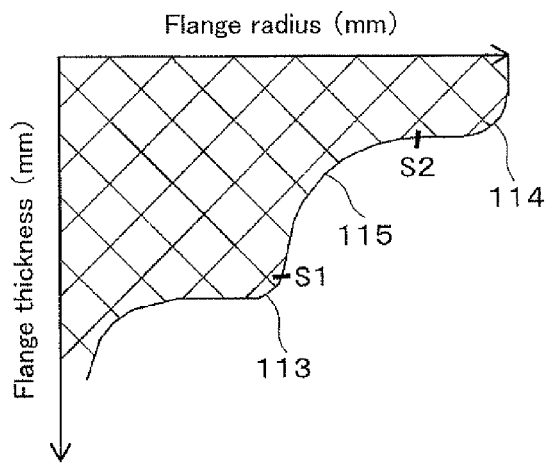
FIGS. 7A to 7C are views for describing cross sectional shapes of a concave portion of a flange of a ball stud relating to an embodiment of the present invention.
Figure 7B:
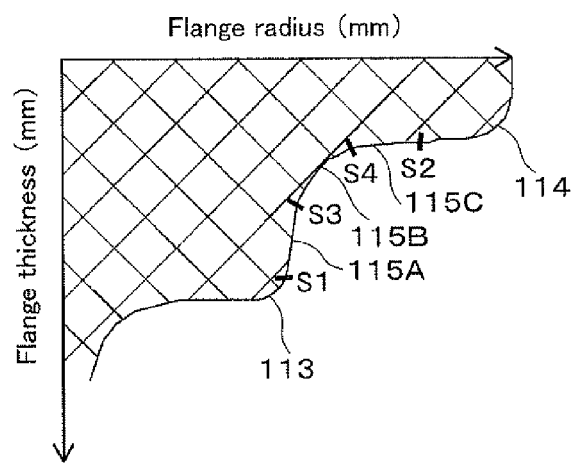
Figure 7C:
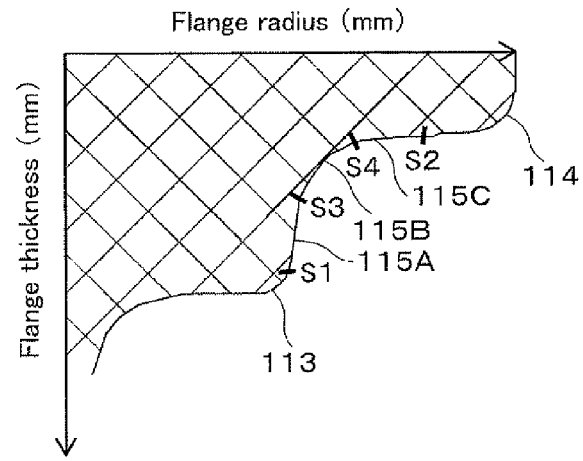

A preferred embodiment of the present invention will be described with reference to figures hereinafter. FIGS. 5A and 5B show an abutting condition of a flange 111 of a ball stud 110 relating to an embodiment of the present invention and a side lip portion 123 of a dust cover 121. FIG. 5A is a cross section of the abutting condition, and FIG. 5B is an enlarged cross section of the structure within the frame indicated by the reference symbol X in FIG. 5A. FIGS. 6A and 6B are views for describing the flange 111 of the ball stud 110 relating to the embodiment of the present invention. FIG. 6A shows a general structure of the ball stud 110, and FIG. 6B is a view for describing the cross sectional shape of a concave portion 112 of the flange 111 of the ball stud 110. FIGS. 7A to 7C are views for describing various cross sectional shapes of the concave portion 112 of the flange 111 of the ball stud 110 relating to the embodiment of the present invention.

Figure 2:
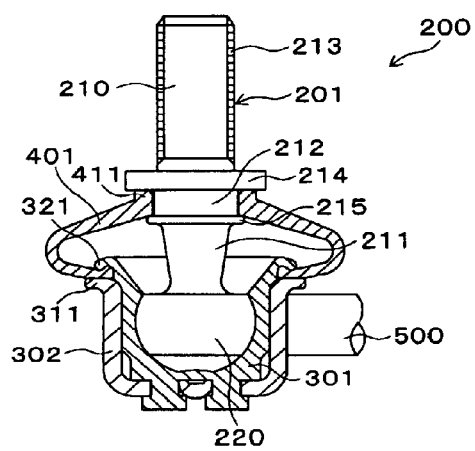
FIG. 2 is a cross section that shows a structure of a conventional stabilizer link.
Figure 3:
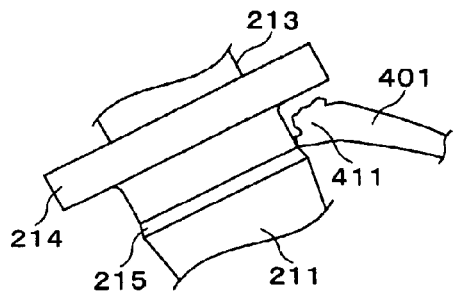
FIG. 3 is a partially enlarged cross section for showing the opening at a lip, which occurs in a conventional stabilizer link.
Figure 4A:
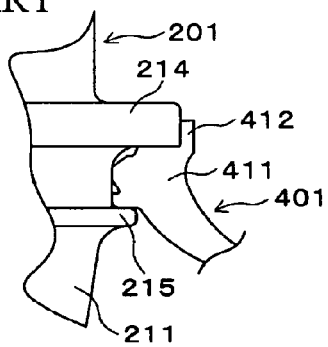
FIGS. 4A and 4B are enlarged cross sections of partial structures for describing folding down, which occurs in a conventional stabilizer link.
Figure 4B:
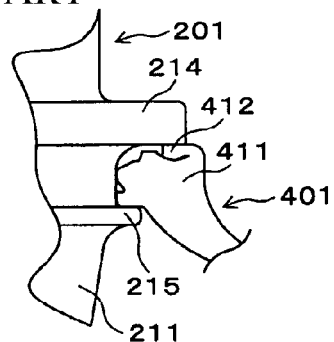

A stabilizer link in this embodiment has the same components as those of the stabilizer link 200 shown in FIGS. 1 and 2, other than the flange of the ball stud and the lip of the dust cover. Therefore, in this embodiment, the same structural components as those shown in FIGS. 1 and 2 have the same reference numerals, and descriptions thereof are omitted. In this embodiment, the cross section is a side cross section which is parallel to the axial direction of the stud portion 210.

The flange 111 of the ball stud 110 outwardly projects in a radial direction of the stud portion 210 as shown in FIGS. 5A, 5B, and 6A. The flange 111 has a root and an outer circumferential portion and has a concave portion 112 that has a curved shape from the root to the outer circumferential portion in the cross section. The concave portion 112 is concave with respect to a straight line connecting an end 112A on the root side and an end 112B on the outer circumferential portion side of the curved shape. The end 112A on the root side of the concave portion 112 is preferably formed with a rounded corner 113 that has a round shape in cross section. The end 112B on the outer circumferential portion side of the concave portion 112 is preferably formed with a rounded corner 114 that has a round shape in cross section. The rounded corners 113 and 114 are smoothly connected with the concave portion 112.

The dust cover 121 has a lip 122 that is made so as to be abutted and closely contact with the sealing portion 212 and the flange 111 of the ball stud 110. The lip 122 is formed with the side lip portion 123 at a circumferential end, and the side lip portion 123 has a shape corresponding to the curved shape of the concave portion 112 of the flange 111 so as to abut on the concave portion 112.

The concave portion 112 of the flange 111 is concave with respect to the straight line connecting the end 112A on the root side and the end 112B on the outer circumferential portion side of the curved shape. Therefore, as shown in FIG. 6B, the concave portion 112 has a larger area for contacting the side lip portion 123 that abuts on the flange 111 when the dust cover 401 is fitted, compared with a flat portion 216 or a tapered portion 217 of a conventional technique. The flat portion 216 has a constant thickness from the root to the outer circumferential portion of the flange. The tapered portion 217 is straightly sloped from the root to the outer circumferential portion of the flange. Moreover, the flange portion 111 is concave and is thereby reduced in weight compared with the flat portion 216 or the tapered portion 217 of the conventional technique. Accordingly, the ball stud 110 is reduced in weight.

Specifically, for example, as shown in FIGS. 6B and 7A, the concave portion 112 has one curved portion 115 (between reference numerals S1 and S2, curvature radius R1) in the intermediate portion between the rounded corners 113 and 114 at both ends. In this structure, the contact area of the concave portion 112 of the flange 111 and the side lip portion 123 of the dust cover 121 is increased by approximately 53% compared with, for example, a structure with a constant flange thickness of a conventional technique (a structure with the flat portion 216). In addition, compared with, for example, the structure with a constant flange thickness (the structure with the flat portion 216), the weight is reduced by approximately 4.6% per ball stud. The reduced amount of weight corresponds to the dotted area surrounded by a short dashed line and a dashed-one dotted line in FIG. 6B. The short dashed line is indicated by reference numeral 112 and represents a single curved shape. The dashed-one dotted line is indicated by reference numeral 216 and represents a shape with a constant flange thickness.

For another example, as shown in FIGS. 6B and 7B, the concave portion 112 is formed with plural (i.e. three) curved portions 115A, 115B, and 115C in the intermediate portion between the rounded corners 113 and 114. The curved portion 115A with curvature radius R2 is formed between portions indicated by reference numerals S1 and S3. The curved portion 115B with curvature radius R3 is formed between portions indicated by reference numerals S3 and S4. The curved portion 115C with curvature radius R2 is formed between portions indicated by reference numerals S4 and S2. The adjacent curved portions 111A to 115C are smoothly connected with each other. In this structure, the contact area of the concave portion 112 of the flange 111 and the side lip portion 123 of the dust cover 121 is increased by approximately 58% compared with, for example, the structure with a constant flange thickness (the structure with the flat portion 216). In addition, compared with, for example, the structure with a constant flange thickness (the structure with the flat portion 216), the weight is reduced by approximately 4.8% per ball stud. The reduced amount of the weight corresponds to the dotted area and a hatched area that is surrounded by a solid line and the short dashed line in FIG. 6B. The solid line is indicated by reference numeral 112 and represents a combined curved shape, and the short dashed line is indicated by the reference numeral 112 and represents the single curved shape.

The plural curved portions having curved shapes in the cross section are formed in the intermediate portion between the rounded corners 113 and 114. This structure is not limited to the structure shown in FIG. 7B, and the number, the curvature radius, and the like, of the curved portions may be appropriately set. For example, in the structure shown in FIG. 7C, the curved portion 115C has a curvature radius R4, whereby the curved portions 115A to 115C have different curvature radius with respect to each other.

Figure 8:
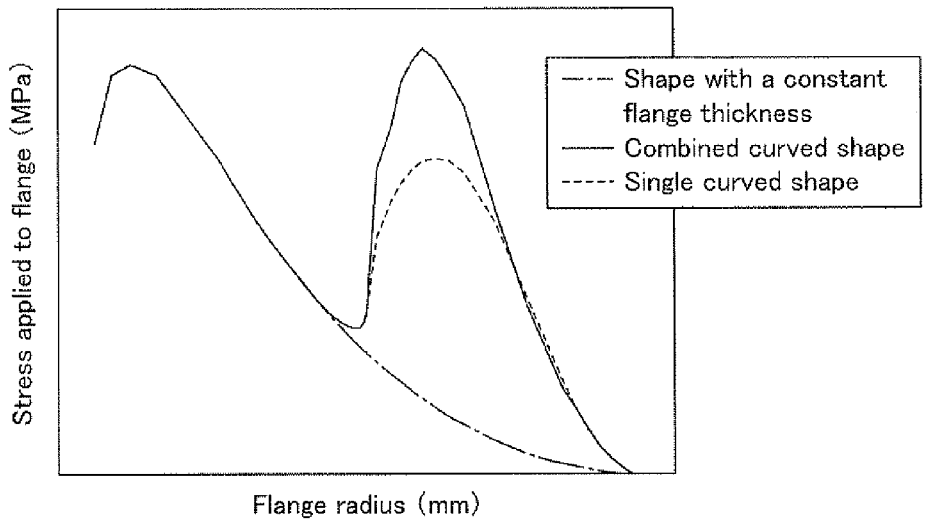
FIG. 8 is a graph that shows a relationship between radius of a flange with each shape of a ball stud relating to an embodiment of the present invention and stress applied to the flange when the stud portion is fastened.

FIG. 8 is a graph that shows a relationship between radius of the flange 111 of the ball stud 110 relating to the embodiment of the present invention and stress applied to the flange 111 when the stud portion is fastened. The stud portion is screwed such that the screw portion 213 is fixed to the bracket 13 of the suspension 10 by screwing or the screw portion 213 is fixed to the bar 21 of the stabilizer 20 by screwing. The relationship shown in FIG. 8 is based on the assumption that surface pressure is uniformly applied to an upper surface of the flange 111 when the stud portion is fastened.

In the conventional structure with a constant flange thickness (the structure with the flat portion 216), the stress peaks at a position corresponding to the rounded corner of the root of the flange and decreases toward the outer circumferential portion. On the other hand, in the structure formed with the concave portion at the flange of the present invention, the stress peaks at the rounded corner of the root of the flange and also peaks at the side of the outer circumferential portion due to the concave portion. In this case, in the structure having the concave portion with plural curved portions, the peak of the stress at the side of the outer circumferential portion is greater than that in the structure having the concave portion with one curved portion. In view of this, the concave portion in the embodiment of the present invention is formed at the flange as follows in order to avoid defects that may occur by the stress at the flange. That is, diameter, thickness, shape, and the like, of the flange are set so that the peak value of the stress will be not more than a predetermined value (=(yield stress value of the ball stud material)×(predetermined safety factor)) at a predetermined position of the flange.

Figure 9:
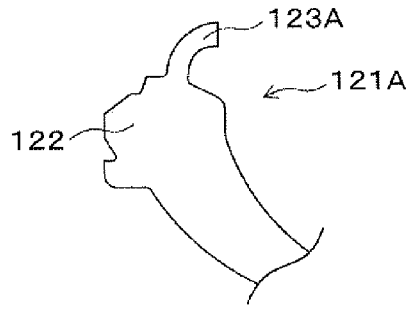
FIG. 9 is a cross section that shows another example of a lip of a dust cover relating to an embodiment of the present invention.
Figure 10:
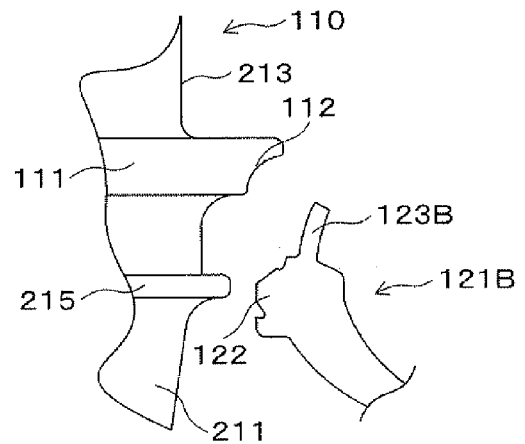
FIG. 10 is a cross section that shows a concave portion of a flange of a ball stud relating to an embodiment of the present invention in combination with another example of a lip of a dust cover.

In the dust cover 121, the side lip portion 123 of the lip 122 preferably has a shape such that the surface pressure is maximum at the circumferential end of the side lip portion 123 when abutted on the concave portion 112 of the flange 111. For example, in the dust cover 121A shown in FIG. 9, the side lip portion 123A has a wall thickness that increases from the root to the circumferential end and is the maximum at the circumferential end. For another example, in the dust cover 121B shown in FIG. 10, the interference of the side lip portion 123B with respect to the concave portion 112 of the flange 111 is increased from the root to the circumferential end and is the maximum at the circumferential end. In these structures, higher sealing characteristics are obtained between the flange 111 of the ball stud 110 and the dust cover 121A or 121B.

In this embodiment, the concave portion 112 has a curved shape from the root to the outer circumferential portion in the axial cross-section of the flange 111 of the ball stud 110. The concave portion 112 is inwardly concave with respect to the straight line connecting the end 112A on the root side and the end 112B on the outer circumferential portion side of the curved shape. Therefore, unlike the case of the structure in which the outer circumferential portion of the flange 111 extends in the direction of the leading end of the axis and has the sharp-edged end, the occurrence of the folding down is prevented. As a result, the assembling productivity in a mass production line is improved.

Moreover, the concave portion 112 with such concaved shape has a larger area for contacting the side lip portion 123 of the dust cover 121 when the dust cover 121 is assembled, compared with the flat portion 216 or the tapered portion 217 of the conventional technique. The flat portion 216 has a constant thickness from the root to the outer circumferential portion of the flange 111. The tapered portion 217 is straightly sloped from the root to the outer circumferential portion of the flange. Accordingly, higher sealing characteristics are obtained between the concave portion 112 and the dust cover 121. Furthermore, the concave portion 112 can be reduced in weight compared with the flat portion 216 or the tapered portion 217 of the conventional technique.

The side lip portion that is formed at an end of the lip 122 of the dust cover 121 has a shape corresponding to the curved shape of the concave portion 112 and abuts on the concave portion 112, thereby having a large area for contacting the flange 111 of the ball stud 110. Therefore, high sealing characteristics are obtained between the flange 111 of the ball stud 110 and the dust cover 121. Accordingly, it is necessary to mount an O-ring to the lip 122 of the dust cover 121, whereby the production cost is reduced.

Since the side lip portion 123 is formed, the occurrence of the opening is prevented even when the ball stud 110 is fully swung in low temperature conditions. A rounded corner may be formed at the root of the side lip portion 123 according to the shape of the rounded corner 113 at the end 112A on the root side of the concave portion 112 of the ball stud 110. In this case, the occurrence of opening of the side lip portion 123 is prevented without increasing biasing force of the side lip portion 123 to the flange 111.

Specifically, since the rounded corner 113 is formed at the end 112A on the root side of the concave portion 112, the side lip portion 123 of the dust cover 121 is stably positioned. Therefore, higher sealing characteristics are obtained between the flange 111 and the dust cover 121. Moreover, since the rounded corner 114 is formed at the end 112E on the outer circumferential portion side of the concave portion 112, the flange 111 has a larger area for contacting the side lip portion 123 of the dust cover 121. Accordingly, further higher sealing characteristics are obtained between the flange 111 and the dust cover 121 is obtained.

The invention claimed is:

1. A ball stud assembly comprising:
a ball stud comprising:
a stud portion with an approximately columnar shape; and
a ball portion that is formed at an end of the stud portion; and
a dust cover that is attached to the stud portion, wherein:
the stud portion is formed with (i) a seal portion having a circular cross section, (ii) an annular flange that projects radially outwardly at a first circumferential portion axially apart from the ball portion, and (iii) an annular projection that projects radially outwardly at a second circumferential portion at an axial side of the seal portion opposite to the flange adjacent the ball portion,
an axial cross section of the flange has a root side end point at a peripheral edge of the flange which is located at a ball portion side, and an outer circumferential point at the peripheral edge of the flange which is located at a position radially outward from the root side end point and opposite to the ball portion side, the axial cross section of the flange being concave with respect to a straight line that connects the root side end point and the outer circumferential point, thereby defining an annular concave portion,
the dust cover includes an annular lip that is abutted on the seal portion of the ball stud,
the lip has an end that is formed with an annular side lip portion, and the side lip portion has a shape corresponding to the concave portion so as to be abutted on the concave portion, and
the side lip portion has a circumferential end adjacent the outer circumferential point of the axial cross section of the flange and has a shape such that the side lip portion is elastically deformed to a radially outward direction by abutting on the concave portion of the flange, whereby surface pressure is a maximum at the circumferential end when abutted on the concave portion of the flange.

2. The ball stud assembly according to claim 1, wherein a portion of the root side end point is formed with a rounded corner that has a round shape in the axial cross-section.

3. The ball stud assembly according to claim 1, wherein a portion of the outer circumferential point is formed with a rounded corner that has a round shape in the axial cross-section.

4. The ball stud assembly according to claim 1, wherein the concave portion has an intermediate part that is formed with one or plural curved portions that have a curved shape in the axial cross-section.

5. The ball stud assembly according to claim 1, wherein the side lip portion has a maximum wall thickness at the circumferential end.

6. The ball stud assembly according to claim 1, wherein the side lip portion has an interference with respect to the concave portion of the flange, and is elastically deformed to a radially outward direction by abutting on the concave portion of the flange, whereby the interference is maximum at the circumferential end.

7. A stabilizer link comprising the ball stud assembly recited in claim 1.

* * * * *